Nov. 3, 1970　　　D. ANDERSON　　　3,537,930
MANUFACTURE OF SCULPTURES
Filed Jan. 23, 1968
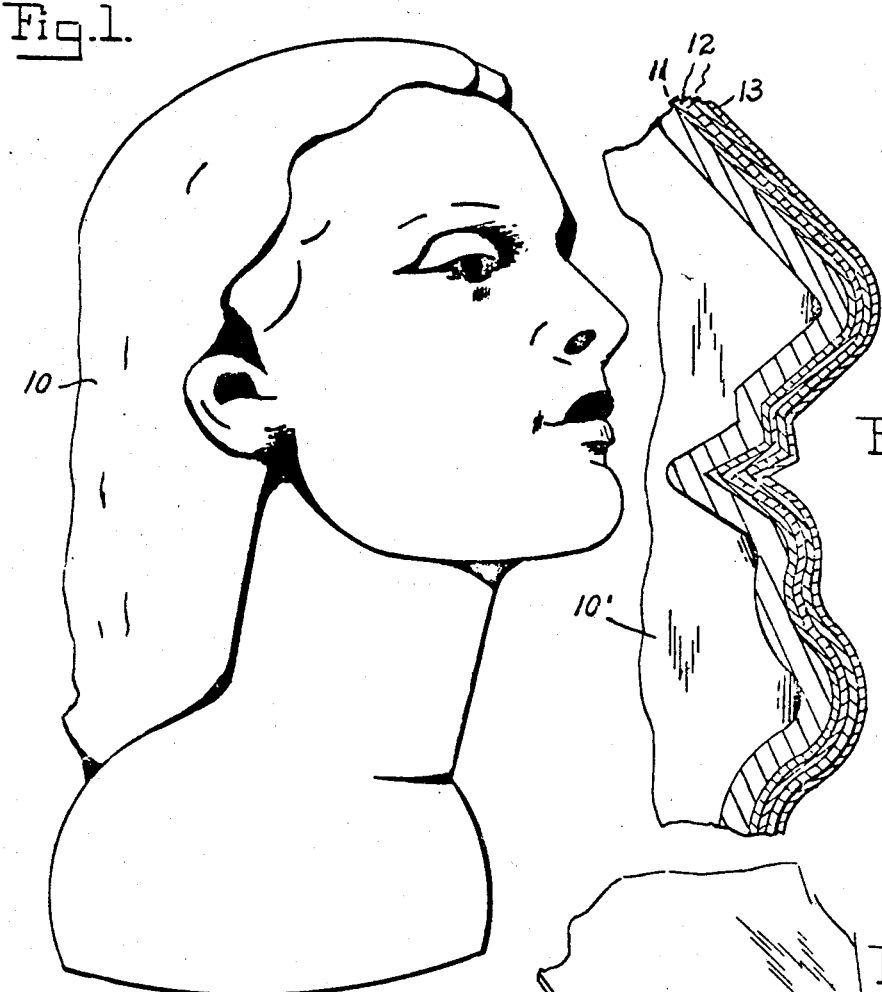
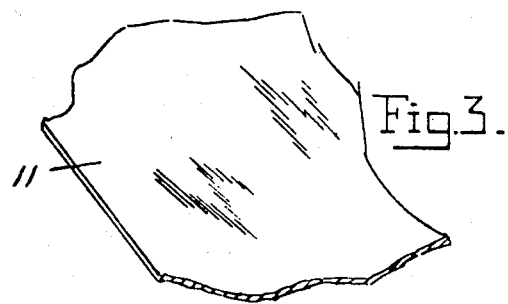
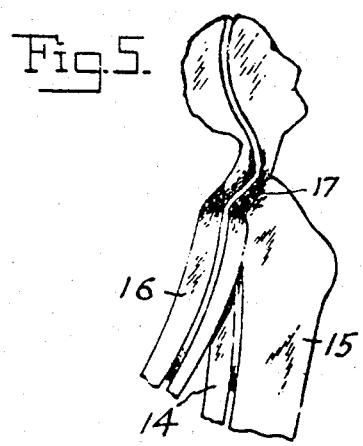
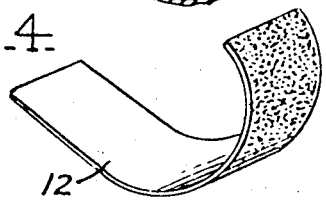
INVENTOR.
DOREEN ANDERSON
BY
James A. Koehl,
atty.

United States Patent Office 3,537,930
Patented Nov. 3, 1970

---

3,537,930
MANUFACTURE OF SCULPTURES
Doreen Anderson, 810 Forest Ave., Elgin, Ill. 60120
Filed Jan. 23, 1968, Ser. No. 704,211
Int. Cl. B29c *17/00;* B44c *3/00;* C23c *1/00*
U.S. Cl. 156—214   3 Claims

ABSTRACT OF THE DISCLOSURE

The disclosure is a sculpture basically of paper having the form, shape and outward appearance of any selected figure or object including the body of a living person. Vinyl acetate sheeting or equivalent material is applied to the surface of the figure or object and manipulated and worked to impart thereto the form, shape and outward appearance thereof. Paper adhesive tape is then superimposed upon the surface of the sheeting and similarly manipulated and worked to cause it to take the form, shape and outward appearance of the figure or object imparted to the sheeting and thereby produce the sculpture.

---

THE FIELD OF THE INVENTION

The invention relates to the art of sculpturing to produce a sculpture basically of paper having the form, shape and outward appearance of any selected figure, or object including the body of a living person.

THE PRIOR ART

In sculpturing, the artists designed works of sculpture from which a model is made usually in plastic from which marble is cut or bronze cast using a mold or matrix to obtain the sculpture.

BRIEF SUMMARY OF THE INVENTION

Vinyl acetate sheeting or equivalent material is applied to the surface of the figure or object and manipulated and worked to cause it to take the form, shape and outward appearance thereof, thereby enabling using the actual figure or object as a mold or matrix from which paper adhesive tape is made into a sculpture having the form, shape and outward appearance of the subject figure or object. The sculpture constitutes a sheath-like covering which is cut into complementary sections and separated from the sheeting and removed from the figure or object. The sections are then rejoined and the sculpture adorned using bronze or other metal or otherwise appropriately ornamented.

OBJECTS AND ADVANTAGES

The primary object of the invention is the manufacture of a sculpture basically of paper using pliable sheeting and adhesive tape and unique sculpturing techniques to obtain, in one embodiment of the invention a finalized sculptured product which is inflexible and may be suitably adorned in any well known manner, and wherein, in another embodiment of the invention, the sculptured product is flexible and has the form, shape and outward appearance of the body of a living person and can be adorned in the manner herein described.

The above and other objects, features and advantages will be apparent from the following description and appended claims.

Referring to the drawings:

FIG. 1 is a view in profile of a sculptured figure made in accordance with the preferred embodiment of the invention;

FIG. 2 is a sectional view of a portion of a figure similar to the one shown at FIG. 1 wherein the sculpturing materials are shown as having applied and worked to impart thereto the form, shape and outward appearance of the figure;

FIG. 3 is a perspective view of a portion of the sheeting material;

FIG. 4 is a perspective view of a portion of adhesive tape of which the sculpture consists, and FIG. 5 is a perspective view of a further embodiment of the invention.

FIG. 1 is the product of the preferred embodiment of the invention as shown in FIG. 2.

Upon referring to the embodiment of the invention shown at FIG. 2, there is applied to the surface of the FIG. 10′ film-like sheeting material 11 such as vinyl acetate, aluminum foil, wax paper or equivalent pliable material to sensibly completely cover same. The sheeting is then manipulated or worked to cause it to acquire the form, shape and outward appearance of the figure. Adhesive tape 12 is then superimposed upon the surface of the sheeting and similarly manipulated or worked to cause it to take the form, shape and outward appearance acquired by the sheeting. The resulting product is a sculpture basically of paper having the characteristics of a sheath which is then cut into complementary sections and separated from the sheeting and removed from the figure and rejoined using adhesive tape. The sculpture is then coated with shellac, varnish or wax to lend slight stiffness thereto.

At FIG. 5, the exemplified embodiment of the invention is a flexible sculpture obtained using the body of a living person or model made in the image thereof.

In carrying this embodiment of the invention into practice, the body of the person or the simulated form, as the case may be, is covered with vinyl sheeting in the same manner as when producing the embodiment shown at FIG. 2. A sufficient amount of the adhesive tape 12 is wrapped about the body to cover it and obtain a substantially hollow flexible figure 10′ in the image or likeness of the form. Substantially in the same manner as when removing the inflexible sculpture from the form, the flexible sculpture is cut at both sides as at 14, 16 and 17. The sections of the sculpture are then rejoined using adhesive tape, and if desired, additional tape may be applied to lend strength thereto. Slight stiffness can be had by applying shellac, varnish or wax to the exterior of the scultpure. The sculpture may be clothed in suitable attire and arranged in any posture and the arms and legs positioned as desired.

An additional embodiment of this invention may include sheathing the above mentioned clothed sculpture in vinyl sheeting in the same manner as when producing the embodiment shown in FIG. 2. Again a sufficient amount of gummed tape is wrapped about the clothed body to cover it and worked to impart thereto the shape of the clothing, including the natural wrinkles, creases, buttons, collars, etc., to obtain a substantially hollow structure 15 in the image or likeness of the clothed form. Again, substantially in the same manner as when removing the inflexible sculpture from the form, the flexible sculpture is cut at both sides as in 14, 16 and 17. The sections are then rejoined as above mentioned and a sculpture of clothing only results. Again, reinforcements of tape strips may be added for strength as well as for changing of shape of the clothing as desired by the artist.

What I claim as my invention is:

1. The manufacture of a sculpture basically of paper comprising, applying to the surface of a selected figure or object pliable sheeting and manipulating and working same to cause it to acquire the form, shape and outward appearance of the figure or object; super-imposing paper adhesive tape upon the sheeting and similarly manipulating and working said paper adhesive tape to cause it to take the form and shape and have an outward appearance of said paper adhesive tape the outward appearance acquired by the sheeting and to form a sheath enclosing the figure or object; cutting the sheath into complementary sections, separating the sections from the sheeting and removing it from the figure or object and then rejoining the sections to recover the form, shape and outward appearance of the figure or object to produce the sculpture.

2. The manufacture of a sculpture according to claim 1 wherein the sheeting is vinyl acetate, aluminum foil, wax paper or equivalent material.

3. The manufacture of a sculpture according to claim 1 wherein the outward surface of the sculpture is coated with metal.

References Cited

UNITED STATES PATENTS

| | | | |
|---|---|---|---|
| 2,165,474 | 7/1939 | Greneker | 40—126 XR |
| 3,077,676 | 2/1963 | Riva | 35—26 |
| 2,309,447 | 1/1943 | Greneker | 40—126 XR |

JOHN T. GOOLKASIAN, Primary Examiner

L. T. KINDELL, Assistant Examiner

U.S. Cl. X.R.

135—26; 117—160; 156—59; 161—19; 264—222

UNITED STATES PATENT OFFICE
CERTIFICATE OF CORRECTION

Patent No. 3,537,930　　　　　　　Dated November 3, 1970

Inventor(s) Doreen Anderson

It is certified that error appears in the above-identified patent and that said Letters Patent are hereby corrected as shown below:

Column 3, line 1, cancel "of said paper adhesive tape the outward appearance".

Signed and sealed this 25th day of May 1971.

(SEAL)
Attest:

EDWARD M. FLETCHER, JR.　　　　　　WILLIAM E. SCHUYLER, JR.
Attesting Officer　　　　　　　　　　Commissioner of Patents